United States Patent
Karlsson

(10) Patent No.: US 8,363,801 B2
(45) Date of Patent: Jan. 29, 2013

(54) CHARGING OF CIRCUIT-SWITCHED VOICE, SMS, MMS AND/OR GPRS PACKET SWITCHED DATA

(75) Inventor: Stefan Karlsson, Karlskrona (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 960 days.

(21) Appl. No.: 12/306,454

(22) PCT Filed: Jun. 1, 2007

(86) PCT No.: PCT/EP2007/004878
§ 371 (c)(1),
(2), (4) Date: Dec. 23, 2008

(87) PCT Pub. No.: WO2008/000334
PCT Pub. Date: Jan. 3, 2008

(65) Prior Publication Data
US 2009/0280773 A1    Nov. 12, 2009

(30) Foreign Application Priority Data
Jun. 28, 2006   (EP) .................................... 06013362

(51) Int. Cl.
*H04M 15/00*   (2006.01)
(52) U.S. Cl. .......... 379/114.03; 379/121.02; 379/127.05
(58) Field of Classification Search ............. 379/114.01, 379/114.03, 114.17, 114.21, 114.28, 121.02, 379/127.04, 127.05; 455/406; 370/352
See application file for complete search history.

(56) References Cited

U.S. PATENT DOCUMENTS

| | | | |
|---|---|---|---|
| 7,899,166 B1* | 3/2011 | Ravindranath et al. | 379/114.2 |
| 2006/0218006 A1* | 9/2006 | Malik et al. | 705/1 |
| 2007/0036312 A1* | 2/2007 | Cai et al. | 379/126 |

FOREIGN PATENT DOCUMENTS

| WO | WO 2005076589 A1 * | 8/2005 |
|---|---|---|
| WO | WO 2006/043165 A | 4/2006 |

OTHER PUBLICATIONS

"Digital cellular telecommunications system (Phase 2+); UMTS; Telecommunication management; Charging management; Online Charging (OCS); Applications and interfaces (3GPP TS 32.296 version 6.0.0 Release 6); ETSI TS 132 296", ETSI Standards vol. 3-SAf, No. V600 (Dec. 2004).

Elmasri and S B Navathe R E: Fundamentals of Database Systems. 1994, pp. 391-421.

* cited by examiner

*Primary Examiner* — Quoc D Tran

(57) ABSTRACT

The present invention provides a flexible selection of subscriber and account related data for charging purposes in a communication network. The subscriber account has at least one charging resource type which is instantiated into at least one charging resource of the charging resource type, and the charging resource is associated with at least one subscriber account. Initially, there is executed an analysis of a service data describing a service event and subscriber/subscriber group related data describing at least one subscriber account to which the service event is to be charged using a configurable analysis structure for generation of a charging resource matching key. The charging resource matching key describes what class of charging resource types could be used for charging the service event. Then, the charging resource matching key is matched to at least one charging resource falling under the classification of the charging resource matching key and being associated with at least one subscriber account to which the service event is to be charged. Finally, the selected at least one charging resource is manipulated.

28 Claims, 6 Drawing Sheets ic account level the inventive charging method provides a higher level of abstraction.

CHARGING OF CIRCUIT-SWITCHED VOICE, SMS, MMS AND/OR GPRS PACKET SWITCHED DATA

FIELD OF INVENTION

The present invention relates to a method of charging a service event in a communication network and a related charging apparatus.

BACKGROUND ART

Telecommunication operators today use charging systems to determine charges to their subscribers which use their services, e.g., circuit switched voice, SMS, MMS and/or GPRS packet switched data. For charging purposes, subscribers often have different options, e.g., a prepaid option or a post-paid option which are used to charge for a particular service event.

Existing charging systems handle data describing subscriber accounts which is not related to a particular service event, e.g., data identifying a subscriber or a subscriber group, data describing tariff plans, etc. Such data will also be referred to as account data in the following.

Existing charging systems also handle dynamic, event-related data. One example would be a count value reflecting the number of SMS service events or MMS service events per subscriber. Another example would be a fund value to be used for charging of dedicated services, e.g., GPRS data traffic of a subscriber.

Usually, event related data is described according to charging resources types and charging resources. E.g., charging resources types are counter type, accumulator type, dedicated account type or sub-account type or buckets. Each charging resource type is instantiated to at least one charging resource, e.g., a counter, a fund value memory, etc. For one charging resource type there may be several instantiations of charging resources.

To associate charging resources with subscriber accounts there exist at least three options. A first option is that subscriber accounts refer to related charging resources. A second option is that charging resources refer to related subscriber account(s). A third option is that subscriber accounts refer to related charging resources which simultaneously refer back the subscriber accounts. In view of memory efficiency current charging systems use the second option. The reason for this is that at subscriber accounts no memory needs to be allocated. Instead, the charging resource itself keeps all the data that is needed in order to make it work.

For charging of service event there is executed an analysis of combined account data and event-related data with respect to the service event to identify one or more charging resources being connected to one or more subscriber accounts. A first step in such analysis is execution of a selection process to identify a charging resource for the service event. Then follows a data base query to find the selected resources connected to the subscriber account.

However, existing solutions handle charging resources per subscriber account according to pre-determined definitions. This is also true for so-called subscriber groups where all members of the subscriber group use a common definition of their charging resources.

Therefore, when executing a selection process with respect to a service event the selection process needs to be executed according to the pre-determined definitions, or in other words on the level of the pre-determined definitions, both for individual subscribers and subscriber groups. The reason heretofore is that the selection process needs to be aligned with the underlying definitions of charging resources.

While this approach is viable with a limited amount of charging resources it gets more and more difficult to manage when the number of charging resources and services increase, even if the charging resource definitions are made on a group level.

SUMMARY OF INVENTION

In view of the above the technical problem of the present invention is to provide a flexible selection of subscriber and account related data for charging purposes in a communication network.

According to the present invention this object is achieved by a method of charging a service event in a communication network to at least one subscriber account. The subscriber account has at least one charging resource type which is instantiated into at least one charging resource of the charging resource type and the charging resource is associated with at least one subscriber account.

In a first step of the inventive charging method there is executed an analysis of service data describing the service event and of subscriber/subscriber group related data describing at least one subscriber account to which the service event is to be charged.

An insight underlying the present invention is that the analysis step need not be executed on the level of charging resource definition. From a view point of efficiency, it is more appropriate to indentify ab initio what class of charging resource type(s) may be suited for handling the service event. In other words the analysis step generates a charging resource matching key that characterizes charging resource types that could be used for charging the service event.

It should be understood that the charging resource matching key may characterize relevant charging resources on different levels of abstraction, e.g., charge service event as data service, charge service event as SMS data service, charge service event as SMS mobile originating data service etc. In determining in advance on what level of abstraction the charging resource matching key is generated by the analysis step, it is possible to achieve the generation of the charging resource matching key in a configurable way.

Further, in a second step of the inventive charging method the charging resource matching key is matched to at least one charging resource associated with at least one subscriber account to which the service event is to be charged. Here, matching means identifying those charging resources which fall under the classification of the charging resource matching key.

Finally, in a third step of the inventive charging method the selected at least one charging resource will be manipulated in view of the service event to be charged. Typical examples for the meaning of manipulating are, e.g., decrementing a charging resource counter as payment for a SMS service event when the counter holds the number of free SMS given as a bonus to a service subscriber, incrementing the charging resource counter prior to service delivery for set-up of a bonus, incrementing a dedicated charging resource account holding an amount of money for establishment of a bonus, or decrementing a dedicated charging resource account for charging of a service event.

In view of the above, according to the present invention memory efficiency is significantly improved due to the generalization of the selection and matching logic underlying the charging process. Instead of operating on the full and detailed definitions of charging resources on a subscriber/subscriber group level, the selection of charging resources is executed on a more abstract level by generating a charging resource matching key, followed by a matching of the charging resource matching key for adaptation of the selection result to at least one individual charging resource. This enables an optimized global selection configuration with the option to attach any charging resource to any service event.

According to a preferred embodiment of the present invention the step of analysing the service data and the subscriber/subscriber group related data is achieved by traversing a decision tree. Preferably, a first subset of nodes of the decision tree have assigned thereto a charging resource matching key usable to identify a charging resource and a second subset of nodes of the decision tree have assigned thereto pre-determined data elements for comparison with the service data and the subscriber/subscriber group related data, so as to select the next branch to follow during traversal of the decision tree.

The use of a decision tree is a very flexible approach to selection of a charging resource matching tree. E.g., using a decision tree for generation of charging resource matching keys the charging resource matching key may depend on time of day, provider identity, service identity, user service class, etc. Also, the decision tree naturally supports the generation of charging resource matching keys depending on the depth to which the decision tree is traversed.

According to another preferred embodiment of the present invention the step of analysing the service data and the subscriber/subscriber group related data is achieved by concatenating the service data and the subscriber/subscriber group related data into a string, subsequent comparison of the generated string with pre-determined string constants, and output of the charging resource matching key upon a match of the generated string with pre-determined string constants.

Also this preferred embodiment of the present invention supports a flexible charging of a service event with respect to a specific charging resource on a suitable subscriber account basis. Heretofore, string processing is a very cost-efficient way and again optimizes memory use.

According to another preferred embodiment of the present invention the step of analysing the service data and the subscriber/subscriber group related data is achieved by applying a rule-based selection process on the service data and the subscriber/subscriber group related data.

Here, the rule-based solution represents the previously explained selection process and related criteria in the form of rule statements. A particular benefit of such a rule-based mechanism is the flexibility in changing selection criteria for identifying a charging resource in view of a service event even in real time during execution of the inventive charging method.

According to another preferred embodiment of the present invention the step of matching the charging resource matching key is executed such that a plurality of charging resource identifications match the charging resource matching key. Optionally, the plurality of charging resource identifications matching the charging resource matching key are related to a plurality of charging resource types.

This preferred embodiment avoids a fixed one to one relationship between a service event and one single charging resource. To the contrary, charging resources of the same or different types may match the same service event. Here, an example could be the manipulation of, both, dedicated accounts and usage accumulators for the same service event. There is generated redundant information in the charging system in support of communication resource evaluation also by telecommunication operators.

According to another preferred embodiment of the present invention, the plurality of charging resource identifications may be organized into a hierarchical logical structure.

This preferred embodiment enables efficient manipulation of a plurality of charging resources in view of a given charging resource identification. E.g., given a specific charging resource identification for manipulation of a charging resource allows to apply similar manipulation to charging resources to be found upwards or downwards in the hierarchy of charging resource identifications.

According to other preferred embodiment of the present invention there is executed a step of distributing the charges of the service event among the plurality of subscriber accounts according to a pre-determined distribution scheme.

This preferred embodiment of the present invention again increases flexibility as there is no more a fixed relation between a service event and a single charging resource. E.g., for a service event their may be identified a first charging resource and a second charging resource, where part of the service charge is compensated for by the first charging resource and part of the service charge is compensated for by the second charging resource. Alternatively, the first charging resource could be the default, while the second charging resource is manipulated only when the first charging resource is consumed up.

According to other preferred embodiment of the present invention there is executed a step of date stamping at least one charging resource for individual life cycle control of the date stamped charging resource.

This preferred embodiment of the present invention supports simple individual life cycle control of charging resource, e.g., for pre-paid services.

According to another preferred embodiment of the present invention there is provided a computer program product directly loadable into the internal memory of a charging apparatus comprising software code portions for performing the inventive charging process when the product is run on a processor of the charging apparatus.

Therefore, the present invention is also provided to achieve an implementation of the inventive method steps on computer or processor systems. In conclusion, such implementation leads to the provision of computer program products for use with a computer system or more specifically a processor comprised in, e.g., a charging apparatus.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard drives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRIPTION OF DRAWING

In the following the best mode of carrying out the present invention as well as preferred embodiments will be described with reference to the drawing in which.

DESCRIPTION OF BEST MODE AND PREFERRED EMBODIMENTS

Figure 1:
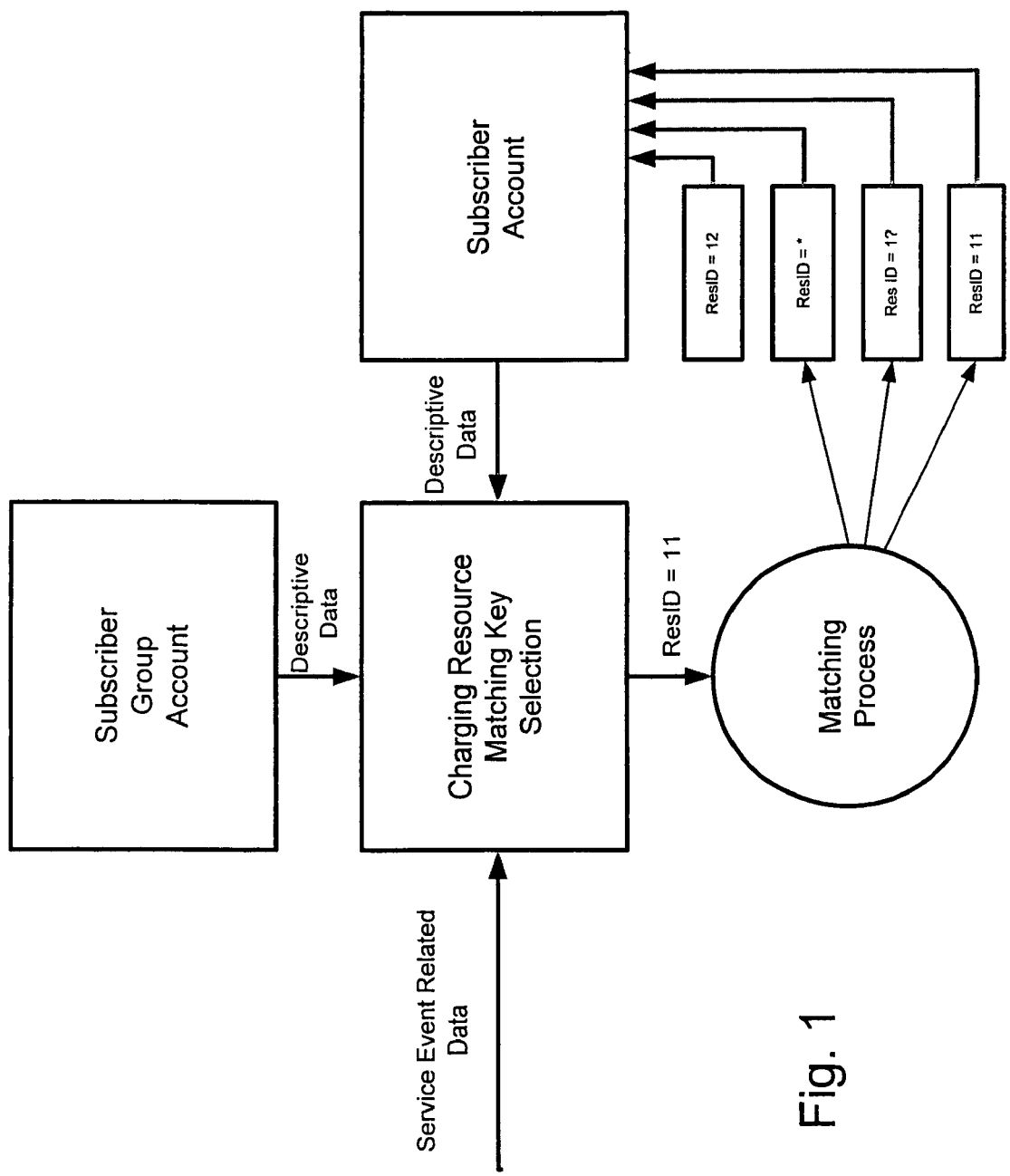
FIG. 1 shows an overview on the concept underlying the present invention.

In the following, the best mode of carrying out the present invention as well as preferred embodiments thereof will be explained with reference to the drawing. Insofar as different functionalities of the present invention are described such functionalities may be achieved either in hardware, in software, or by a combination there.

Generally, the charging method and apparatus according to the present invention fulfil at least the following objectives, e.g., in a real-time charging database environment:

From service event data and subscriber account/group account data a specific charging resource or several charging resources of one or several charging resource types for the subscriber account/group account are identified.

The selection is achieved per subscriber account, i.e., the subscriber accounts preferably have no dependencies to each other.

The individual charging resource is either limited to be used by a single subscriber account or may be shared between several charging accounts.

The charging process has to be achieved in real time for real time/online charging.

The charging solution enables handling of a large amount of charging resources within each charging resource type while being memory efficient.

FIG. 1 shows an overview on the concept underlying the present invention fulfilling the objectives outlined above.

As shown in FIG. 1, the charging process according to the present invention starts from a set-up of at least one subscriber account or/and at least one group account where a plurality of subscriber share similar charging conditions. The subscriber account and group account hold descriptive data, e.g., of subscriber identifications and charging resource definitions which are independent of specific service events.

Further, the subscriber account has at least one charging resource type which is instantiated into at least one charging resource. The charging resource is associated with at least one subscriber account.

An example for a charging resource is an accumulator which is used to accumulate usage of a service in order to be able to apply bonus based on user consumption. Examples include send ten SMS and get one free of charge. Another example is to handle bundled contract where a number of free units is included for a specific service, e.g., one hundred minutes free of charge or fifty SMS sold in batches for a fee.

Another example for a charging resource is a dedicated account or in other words a sub-account. Dedicated accounts may be used to dedicate charges for usage of a specific service. Examples are 10$ for MMS of a dedicated charging account used for data traffic, e.g., 20$ included in a monthly fee. Other dedicated funds could be any type of, e.g., data volume, service time, or number of service events.

As shown in FIG. 1, the charging process according to the present invention uses descriptive data available from subscriber accounts or subscriber group accounts in combination with service event related data for charging of the service event. Hereby, charging of the service event is a two-staged process. At a first stage a charging resource matching key ResID or equivalently a charging resource identification ResID is selected for the submitted service event. At a second stage the charging resource identification ResID is mapped to an actual charging resource of a subscriber account, as shown in FIG. 1, or a subscriber group account.

It should be understood that the selection of a charging resource matching key ResID allows for an abstraction in view of actual instantiations of charging resources. In other words the charging resource matching key describes what class of charging resource types may be suited for handling the service event. In other words the analysis step generates a charging resource matching key that characterizes charging resource types that could be used for charging the service event.

As outlined above, it should also be understood that the charging resource matching key may characterize relevant charging resources on different levels of abstraction, e.g., charge service event as data service, charge service event as SMS data service, charge service event as SMS mobile originating data service etc. In determining in advance on what level of abstraction the charging resource matching key is generated at the analysis stage, it is possible to achieve the generation of the charging resource matching key in a configurable way.

As shown in FIG. 1, at a second stage of inventive charging process the charging resource matching key ResID is matched to at least one charging resource identification associated with at least one subscriber account to which the service event is to be charged. Here, matching means identifying those charging resources which fall under the classification of the charging resource matching key.

As shown in FIG. 1, as an example one may assume that a generated charging resource matching key is ResID=11. This charging resource matching key is to be mapped to definitions of individual charging resources identifications ResID=12, ResID=*, ResID=1?, and/or ResID=11. A comparison of the charging resource matching key and the individual charging resources gives a match for ResID=*, ResID=1?, and ResID=11 so that three charging resources are identified for charging the service event.

As shown in FIG. 1, the identifications for individual charging resources associated with the subscriber account(s) and similarly with the subscriber group account(s) may be comprise wild cards * and ?. Here ? may match any one digit number of a used number system, e.g., decimal, hexadecimal, octal, binary, etc., and * may match any number of any size in the used number system. As will be explained in more detail with respect to FIG. 6 below, the use of wild cards allows to establish a hierarchical structure on charging resource identifications and generally to get matches on more instances.

E.g., assume that with respect to a specific SMS service event a plurality of charging resources are to be manipulated, e.g., SMS charging resource and data transaction charging resource, with indication of the SMS charging resource it would be clear that also the data transaction charging resource on a higher level in the hierarchy would have to be manipulated.

Although not shown in FIG. 1, a final step of the charging process according to the present invention is the manipulation of the at least one charging resource after execution of the mapping stage.

As shown in FIG. 1, the present invention generalizes the selection and matching logic underlying the charging process. Instead of operating on the full and detailed definitions of charging resources on a subscriber/subscriber group level, the selection of charging resources is executed on a more abstract level by use of charging resource matching key, followed by a matching of the charging resource matching key for adaptation of the selection result to at least one individual charging resource. This leaves an option to attach any charging resource to any service event.

Figure 2:
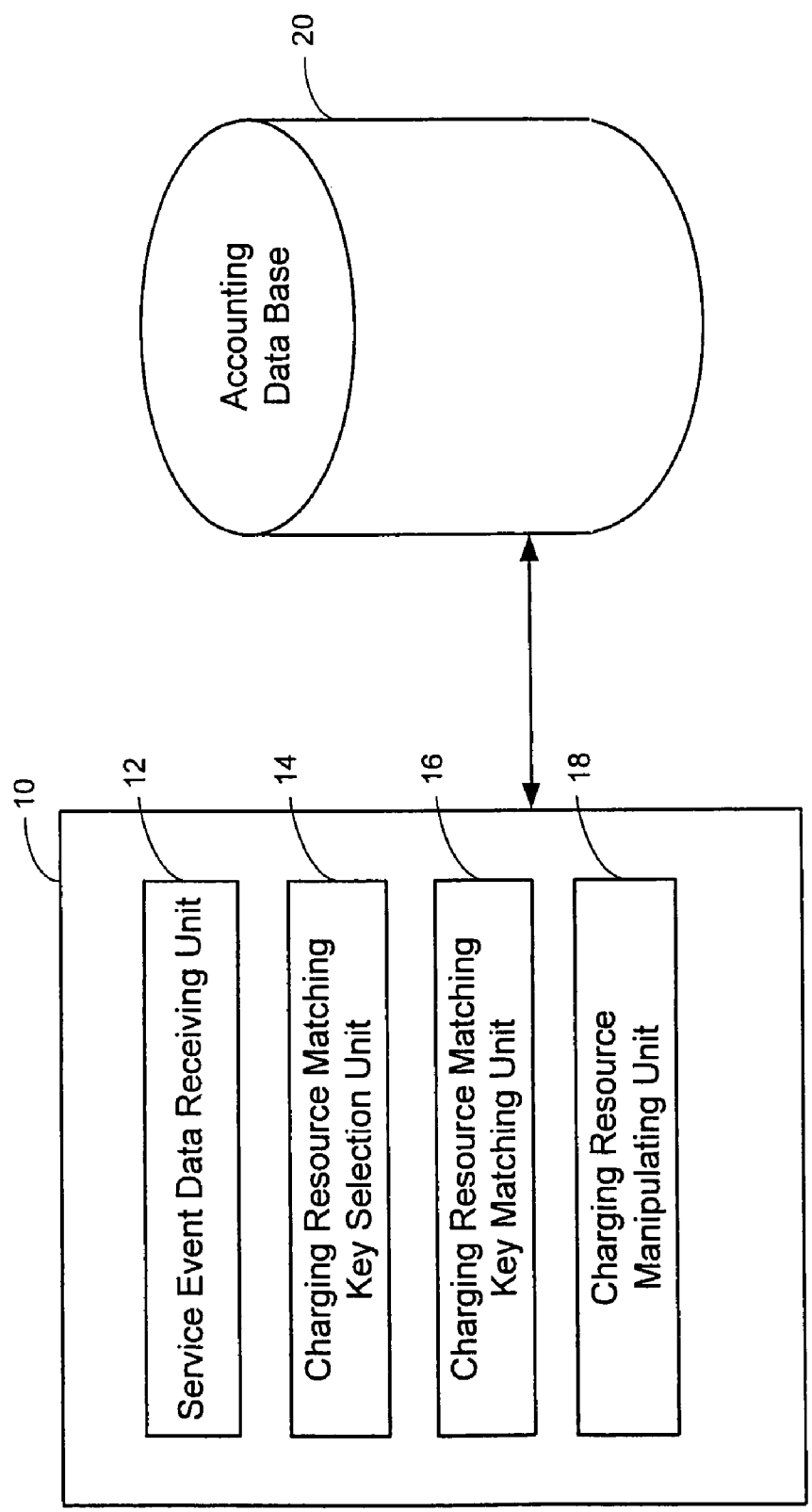
FIG. 2 shows a schematic diagram of a charging apparatus according to the present invention.

FIG. 2 shows a schematic diagram of a charging apparatus according to the present invention.

As shown in FIG. 2, the charging apparatus 10 comprises a service event data receiving unit 12, a charging resource matching key selection unit 14, a charging resource matching key mapping unit 16, and a charging resource manipulating unit 18.

As shown in FIG. 2, the charging apparatus is connected to an accounting data base 20, which maintains all charging related data. Alternatively, the accounting data base may be integrated into the charging apparatus.

Figure 3:
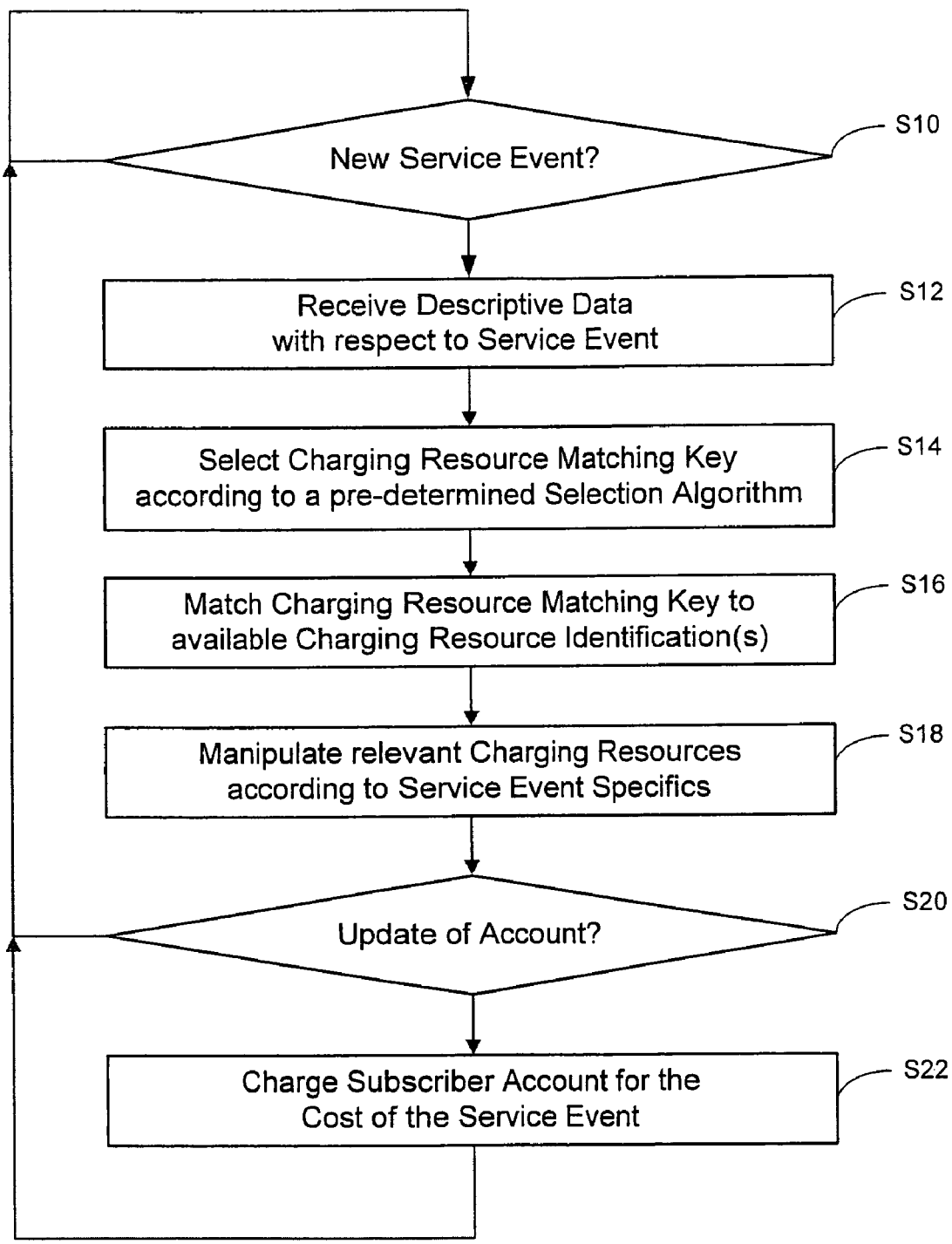
FIG. 3 shows a flowchart of operation of the charging apparatus shown in FIG. 2.

FIG. 3 shows a flowchart of operation of the charging apparatus shown in FIG. 2.

As shown in FIG. 3, in a step S10, executed by the service event data receiving unit 10, there is executed an evaluation with respect to availability of new service event related data. In the affirmative case, in step S12, executed by the service event data receiving unit 10, the new service event related data will be received for subsequent processing thereof. Otherwise, the operation will branch back from step S10 until new service event related data becomes available.

As shown in FIG. 3, in a step S14, executed by the charging resource matching key selection unit 14 shown in FIG. 2, there is executed an analysis of service data describing the service event and subscriber/subscriber group related data describing at least one subscriber account to which the service event is to be charged using a configurable analysis structure for generation of a charging resource matching key. This analysis may be achieved according to different selection algorithms to be described in the following.

As shown in FIG. 3, in a step S16, executed by the charging resource matching key mapping unit 16 shown in FIG. 2, the charging resource matching key mapped to at least one charging resource associated with at least one subscriber account to which the service event is to be charged.

As shown in FIG. 3, in a step S18, executed by the charging resource manipulating unit 18 shown in FIG. 2, the at least one charging resource identified in step S16 will be manipulated. Here, manipulating may comprise updating a service usage counter or updating a subscriber account or a dedicated account or a sub-account or a bucket, as an example.

As shown in FIG. 3, in a step S20, executed by the charging resource manipulating unit 18 shown in FIG. 2, there follows an interrogation whether the subscriber account being associated with the selected and manipulated charging resource(s) is to be charged. In the affirmative case the follows a step S22, executed by the charging resource manipulating unit 18 shown in FIG. 2, to charge at least one subscriber account for the cost of the service event using the content of the at least one manipulated charging resource. Otherwise the operation will branch back to step S10 to check for new service event related data.

It should be understood that the step S20 shown in FIG. 3 is optional when service events are charged in real time. However, one may reasonably assume that service events are only charged according to a predetermined timing, e.g., after lapse of a pre-determined charging period, in which case the interrogation step S20 is executed according to such pre-determined charging schedule.

Figure 4:
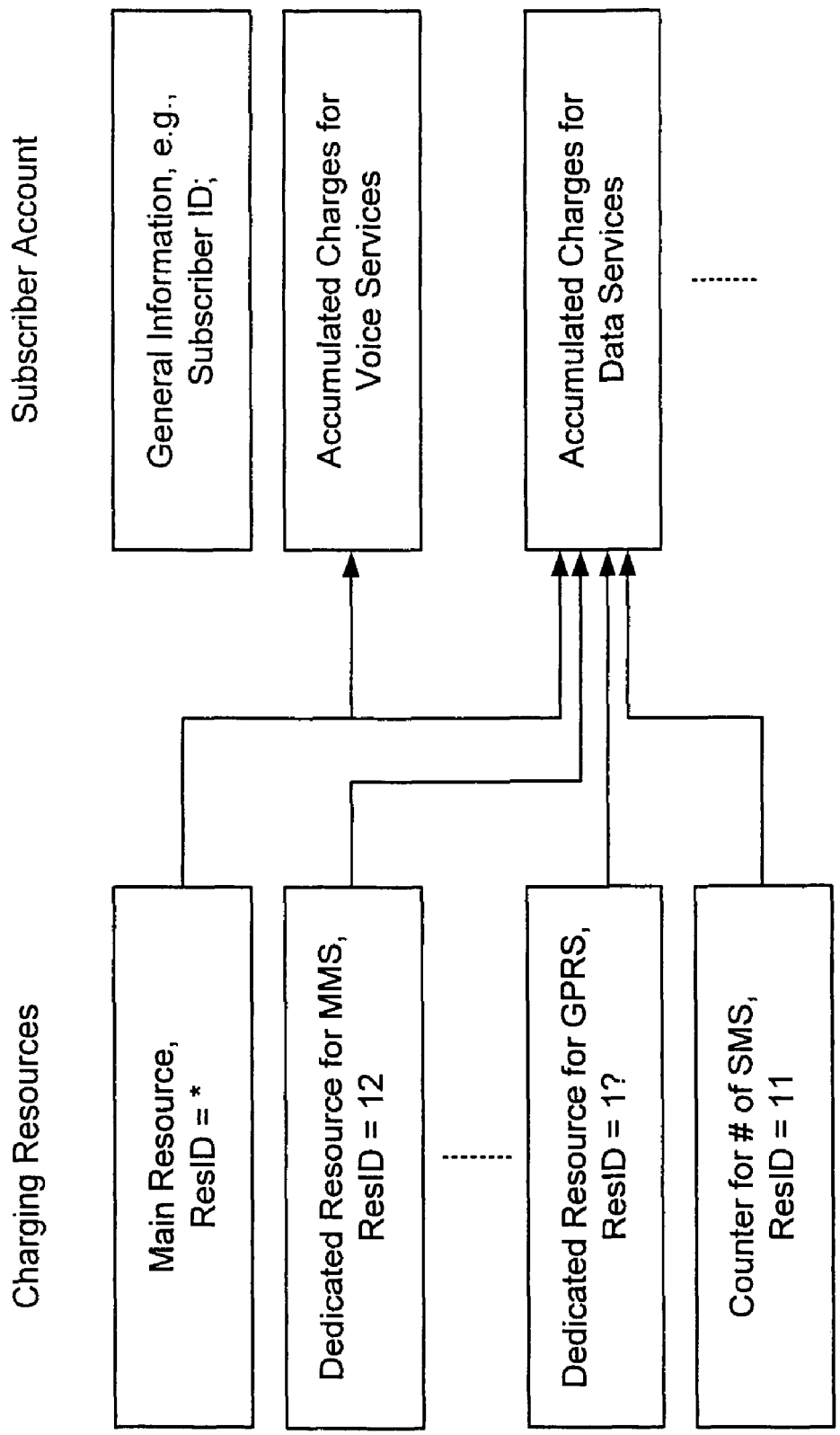
FIG. 4 shows different associations between charging resources and subscriber accounts according to the present invention.

FIG. 4 shows different associations between charging resources and subscriber accounts according to the present invention for further explanation of the charging step S22 shown in FIG. 3.

As shown in FIG. 4, a plurality of charging resource identifications resources shown on the left side of FIG. 4 may match the charging resource matching key, e.g., ResID=11. Also, such charging resource identifications may be of different charging resource types.

As shown in FIG. 4, different charging resources shown on the left side of FIG. 4 have a connection to at least one subscriber account. After manipulation of the charging resources step S22 achieves charging at least one subscriber account for the cost of a service event using the content of the at least one manipulated charging resource.

As shown in FIG. 4, according to the present invention it is possible to distribute the charges for a service event among the plurality of subscriber sub-accounts according to a pre-determined distribution scheme. E.g., in the example shown in FIG. 1 there has been a match for three charging resource having ResID=*, ResID=1?, and ResID=11 so that three charging resources are available for charging a related service event.

If the charging resources were charging accumulators, the values of all three matching charging resources would be updated. If the three charging resources instead were charging accounts, funds from all three charging accounts could be used to cover costs of a service event, if need.

As shown in FIG. 4, several different charging resource types could be applicable for a service event. Also, the matching process may implement a matching based on specific criteria, such as best match with most digits being correct, only full length match, using a start with criteria, an end with criteria, further minimum digits matching, highest priority if a priority is assigned to a charging resource, based on selection order, expiry date of charging resource, highest amount of charging resource, oldest charging account, youngest charging account, etc.

Also not shown in FIG. 4, it should be noted charging resources may date stamped or time stamped for individual life cycle control.

In the following different examples for selection algorithms underlying the execution of step S16 shown in FIG. 3 and being executed by the charging resource matching key selection unit 14 shown in FIG. 2 will be explained.

A first selection algorithm for analysis of the service data and the subscriber/subscriber group related data may be a traversal a decision tree.

Figure 5:
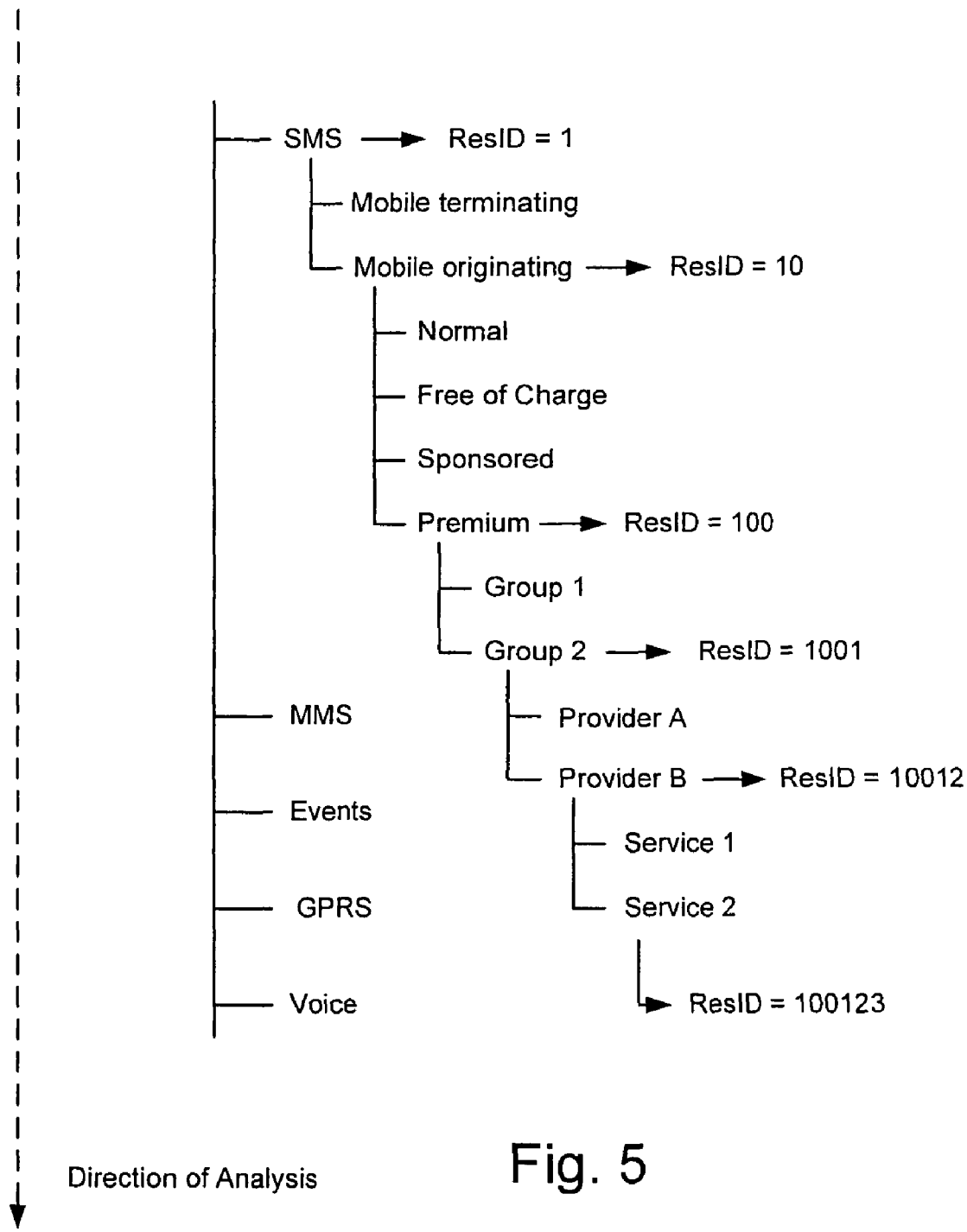
FIG. 5 shows an example of a decision tree for use in selection of a charging resource matching key according to the present invention.

FIG. 5 shows an example of a decision tree for use in selection of a charging resource matching key according to the present invention.

As shown in FIG. 5, a first subset of the decision tree nodes have assigned thereto a charging resource matching key usable to identify a charging resource and a second subset of decision tree nodes have assigned thereto pre-determined data elements for comparison with the service data and the subscriber/subscriber group related data, so as to select the next branch to follow during traversal of the decision tree.

As shown in FIG. 5, a decision tree may be seen as a graphical representation an algorithm. Through traversal of the decision tree and depending on the depth of traversal it is possible to generate charging resource matching keys of different types, what makes the selection process configurable.

An alternative to the decision tree shown in FIG. 5 would be a tabular representation. A table solution may be seen as multidimensional matrix, wherein different parameters for control of the charging resource matching key selection make up different dimensions of the matrix. E.g., in the easiest implementation there might be only one or two dimensions. In the first case this would be a list where for instance each service event like voice, SMS, MMS, e-mail, MP3 download, etc., is related to an individual charging resource matching key. Adding one dimension to the table could make the analysis time day dependent, e.g., working day versus weekend or with respect to special days like holidays.

Further a second selection algorithm for analysis of the service data and the subscriber/subscriber group related data may be to concatenate the service data and the subscriber/subscriber group related data into a string, to then compare the generated string with pre-determined string constants, and to output of the charging resource matching key upon a match of the generated string with pre-determined string constants.

Such second types of algorithms would implement a procedure or formulae to make the selection. One example is to add all selection parameters one after another as a long string, wherein default values are inserted if a parameter is missing from the input. The selection process will then compare the string, in full or in part, against string constants and thus identify a charging resource matching key at a string match. This could be further expanded by aggregating the information by taking a hash sum of the string, comparing this hash sum against constants to select a charging resource matching key.

Yet another option over hash sum is a non-destructive compression of the string for use as charging resource matching key. If there are relations between some of the selection parameters, individual operations could be executed to compress the information with respect to the relating parameters and add all results to a common string for use of that common string.

Further a third selection algorithm for analysis of the service data and the subscriber/subscriber group related data may be to apply a rule-based selection process on the service data and the subscriber/subscriber group related data.

A rule-based selection algorithm would represent the selection criteria as rule statements, e.g.:

If a SMS is sent on a week-end day to a subscriber within the home communication network the charging resource matching key shall be set to XXX, or If a MP3 file is downloaded and the accumulated download file size is larger than Y, the charging resource matching key shall be set to XXX, else it shall be set to YYY.

Figure 6:
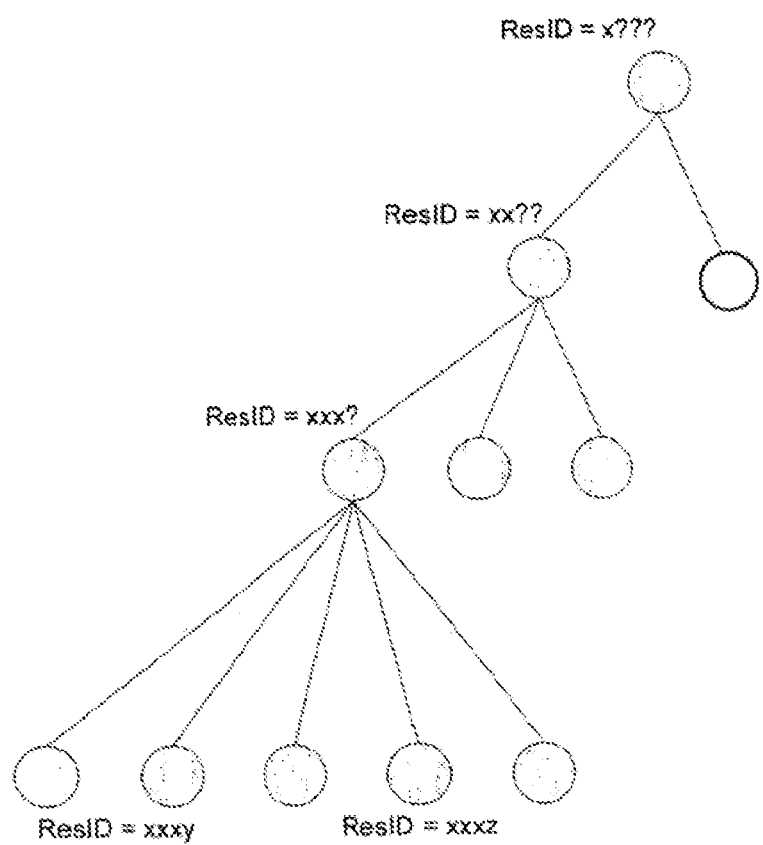
FIG. 6 shows an organization of charging resource identifications into a hierarchical structure according to the present invention.

FIG. 6 shows an organization of charging resource identifications into a hierarchical structure according to the present invention.

As an example, the charging resource identification on the highest level may be related to messaging services, the charging resource identification on the second level may be related to SMS, the charging resource identification on the third level may be related to SMS content provider, and the charging resource identification on the fourth level may be related to SMS contents.

As shown in FIG. 6, the use of a hierarchical structure for the organization of charging resource identifications enables efficient manipulation of a plurality of charging resources in view of a given charging resource identification. E.g., given a specific charging resource identification for manipulation of a charging resource allows to apply similar manipulation to charging resources to be found upwards or downwards in the hierarchical structure of charging resource identifications.

Thus, the use of a hierarchical structure is useful when a charging system needs to consider charging resources according to charging resource identifications on different hierarchy level individually.

As shown in FIG. 6, the coding would be, e.g., that each node in the hierarchy of charging resource identifications is coded using four digit numbers which means that a three digit number followed by ? or * wild cards matches all four digit numbers with identical first three digits, i.e. all nodes being lower in hierarchy. Similar examples may be constructed with two digits followed by ?? or *, etc.

The invention claimed is:

1. A method of charging a service event in a communication network to a subscriber account, having a charging resource type which is instantiated into a charging resource of the charging resource type, the charging resource being associated with the subscriber account, the method comprising the steps:

analysing service data describing the service event and subscriber or subscriber group related data describing the subscriber account to which the service event is to be charged using a configurable analysis structure for generation of a charging resource matching key, wherein the charging resource matching key describes what class of charging resource types can be used for charging the service event;

matching the charging resource matching key to the charging resource falling under the classification of the charging resource matching key and being associated with the subscriber account to which the service event is to be charged; and manipulating the selected the charging resource.

2. Method according to claim 1, wherein the step of analysing the service data and the subscriber or subscriber group related data is achieved by traversing a decision tree.

3. Method according to claim 2, wherein a first subset of the decision tree nodes have assigned thereto a charging resource matching key usable to identify a charging resource and a second subset of decision tree nodes have assigned thereto pre-determined data elements for comparison with the service data and the subscriber or subscriber group related data, so as to select the next branch to follow during traversal of the decision tree.

4. Method according to claim 1, wherein the step of analysing the service data and the subscriber/subscriber group related data is achieved by concatenating the service data and the subscriber or subscriber group related data into a string, subsequent comparison of the generated string with predetermined string constants, and output of the charging resource matching key upon a match of the generated string with pre-determined string constants.

5. Method according to claim 1, wherein the step of analysing the service data and the subscriber or subscriber group related data is achieved by applying a rule-based selection process on the service data and the subscriber or subscriber group related data.

6. Method according to claim 1, wherein the step of matching the charging resource matching key to the charging resource associated with the subscriber account is achieved by searching a charging resource having a charging resource identification that matches the charging resource matching key.

7. Method according to claim 6, wherein the step of matching the charging resource matching key is executed such that a plurality of charging resource identifications match the charging resource matching key.

8. Method according to claim 7, wherein the plurality of charging resource identifications matching the charging resource matching key are related to a plurality of charging resource types.

9. Method according to claim 7, wherein the plurality of charging resource identifications are organized into a hierarchical logical structure.

10. Method according to claim 1, wherein the step of manipulating comprises updating a service usage counter.

11. Method according to claim 1, wherein the step of manipulating comprises updating a subscriber account or a dedicated account or a sub-account or a bucket.

12. Method according to claim 10, wherein the step of manipulating further comprises charging the subscriber account for the cost of a service event using the content of the charging resource.

13. Method according to claim 12, wherein it further comprises a step of distributing the charges of the service event among the plurality of subscriber accounts according to a pre-determined distribution scheme.

14. Method according to claim 1, further comprising a step of date stamping or time stamping the charging resource for individual life cycle control of the date stamped charging resource.

15. Charging apparatus for charging a service event in a communication network to a subscriber account, having a charging resource type which is instantiated into a charging resource of the charging resource type, the charging resource being associated with the subscriber account, the charging apparatus comprising:
a resource identification selection unit adapted to analyse service data describing the service event and subscriber/subscriber group related data describing the subscriber account to which the service event is to be charged using a configurable analysis structure and adapted to generate of a charging resource matching key;
a resource identification matching unit adapted to match the charging resource matching key to the charging resource associated with the subscriber account to which the service event is to be charged; and
a charging resource manipulating unit adapted to manipulate the selected one charging resource.

16. Charging apparatus according to claim 15, wherein the resource identification selection unit is adapted to analyse the service data and the subscriber or subscriber group related data by traversing a decision tree.

17. Charging apparatus according to claim 16, wherein a first subset of decision tree nodes have assigned thereto a charging resource matching key usable to identify the charging resource and a second subset of decision tree nodes have assigned thereto pre-determined data elements for comparison with the service data and the subscriber or subscriber group related data through the resource identification selection unit, so as to select the next branch to follow during traversal of the decision tree.

18. Charging apparatus according to claim 15, wherein the resource identification selection unit is adapted to analyse the service data and the subscriber/subscriber group related data is by concatenating the service data and the subscriber/subscriber group related data into a string, to then compare the generated string with pre-determined string constants, and to output of the charging resource matching key upon a match of the generated string with pre-determined string constants.

19. Charging apparatus according to claim 15, wherein the resource identification selection unit is adapted to analyse the service data and the subscriber or subscriber group related data by applying a rule-based selection process on the service data and the subscriber or subscriber group related data.

20. Charging apparatus according to claim 15, wherein the resource identification matching unit is adapted to match the charging resource matching key to the charging resource associated with the subscriber account by searching the charging resource having a charging resource identification that matches the charging resource matching key.

21. Charging apparatus according to claim 20, wherein the resource identification matching unit is adapted to match the charging resource matching key such that a plurality of charging resource identifications match the charging resource matching key.

22. Charging apparatus according to claim 21, wherein the plurality of charging resource identifications matching the charging resource matching key are related to a plurality of charging resource types.

23. Charging apparatus according to claim 21, wherein the plurality of charging resource identifications are organized into a hierarchical logical structure in a charging database.

24. Charging apparatus according to claim 15, wherein the charging resource manipulating unit is adapted to update a service usage counter.

25. Charging apparatus according to claim 15, wherein the charging resource manipulating unit is adapted to update a subscriber account or a dedicated account or a sub-account or a bucket.

26. Charging apparatus according to claim 24, wherein the charging resource manipulating unit is adapted to charge the subscriber account for the cost of a service event using the content of the charging resource.

27. Charging apparatus according to claim 26, wherein the charging resource manipulating unit is adapted to distribute the charges of the service event among the plurality of subscriber accounts according to a pre-determined distribution scheme.

28. Charging apparatus according to claim 15, wherein the charging resource manipulating unit is adapted to date stamp or time stamp the charging resource for individual life cycle control of the date stamped charging resource.

* * * * *